United States Patent [19]

Little

[11] Patent Number: 5,097,798
[45] Date of Patent: Mar. 24, 1992

[54] FOWL WATERING SYSTEM

[76] Inventor: Larry L. Little, P.O. Box 270, Carlinville, Ill. 62626

[21] Appl. No.: 535,042

[22] Filed: Jun. 8, 1990

Related U.S. Application Data

[63] Continuation-in-part of Ser. No. 440,272, Nov. 22, 1989.

[51] Int. Cl.$^5$ ............................................. A01K 7/00
[52] U.S. Cl. ..................................... 119/72; 248/58; 119/72.5
[58] Field of Search ................... 119/72, 72.5, 75, 81; 285/24, 27, 405; 24/16 PB, 16 R, 17 AP, 460, 462; 248/74.4, 58

[56] References Cited

U.S. PATENT DOCUMENTS

| | | | |
|---|---|---|---|
| 607,517 | 7/1898 | Meserve | 285/197 |
| 1,049,085 | 12/1912 | Healy | 248/58 |
| 1,305,713 | 6/1919 | Goddard | 248/58 X |
| 2,232,505 | 2/1941 | Abbott | 248/58 |
| 2,304,973 | 12/1942 | Vecchiola | 248/58 |
| 2,549,346 | 4/1951 | Tormo | 248/58 |
| 2,574,309 | 11/1951 | Wood | 248/58 |
| 2,646,818 | 8/1953 | Bimpson | 137/377 |
| 3,330,517 | 7/1967 | Zimmerman | 248/74.4 X |
| 3,455,527 | 7/1969 | Suozzo | 248/74.4 X |
| 3,462,804 | 8/1969 | Renaudin | 248/74.4 |
| 3,602,197 | 8/1971 | Fiorette | 119/72.5 |
| 3,664,305 | 5/1972 | Hart et al. | 119/72 |
| 3,724,425 | 4/1973 | Thompson | 119/72 |
| 3,960,232 | 6/1976 | Hubbell, III | 248/58 X |
| 4,221,188 | 9/1980 | Hostetler | 119/81 X |
| 4,240,602 | 12/1980 | McDonald | 248/58 |
| 4,267,800 | 5/1981 | Keller et al. | 119/72.5 |
| 4,516,533 | 5/1985 | Mallinson | 119/72 |
| 4,543,912 | 10/1985 | Steudler | 119/18 |
| 4,669,422 | 6/1987 | Steudler | 119/72 |
| 4,724,797 | 2/1988 | Steudler | 119/72 |
| 4,753,196 | 6/1988 | Lack et al. | 119/72 |
| 4,852,522 | 8/1989 | Uri | 119/72 |
| 4,884,528 | 12/1989 | Steudler | 119/72.5 |
| 4,892,061 | 1/1990 | Steudler | 119/75 |
| 4,903,999 | 2/1990 | Steudler | 285/197 |

FOREIGN PATENT DOCUMENTS 619209  3/1989  United Kingdom ................. 248/58

Primary Examiner—Gene Mancene
Assistant Examiner—Thomas Price
Attorney, Agent, or Firm—Marshall, O'Toole, Gerstein, Murray & Bicknell

[57] ABSTRACT

A poultry watering apparatus comprising a water pipe and a thin anti-roost member extending upwardly from the pipe. In one form of the invention, the pipe and the member are formed integrally, and a coupling is attached to the member for suspending the pipe. In another form of the invention one or more pipe hangers are provided, each comprising a clamp having opposing members which form an opening therebetween for a pipe and an upwardly extending anti-roost member connected to the upper side of the clamp. A coupling is provided comprising a clamp and an anti-roost member both of substantially identical shape as the pipe hangers but also being slightly larger and enveloping the pipe hangers in order to support them.

4 Claims, 4 Drawing Sheets

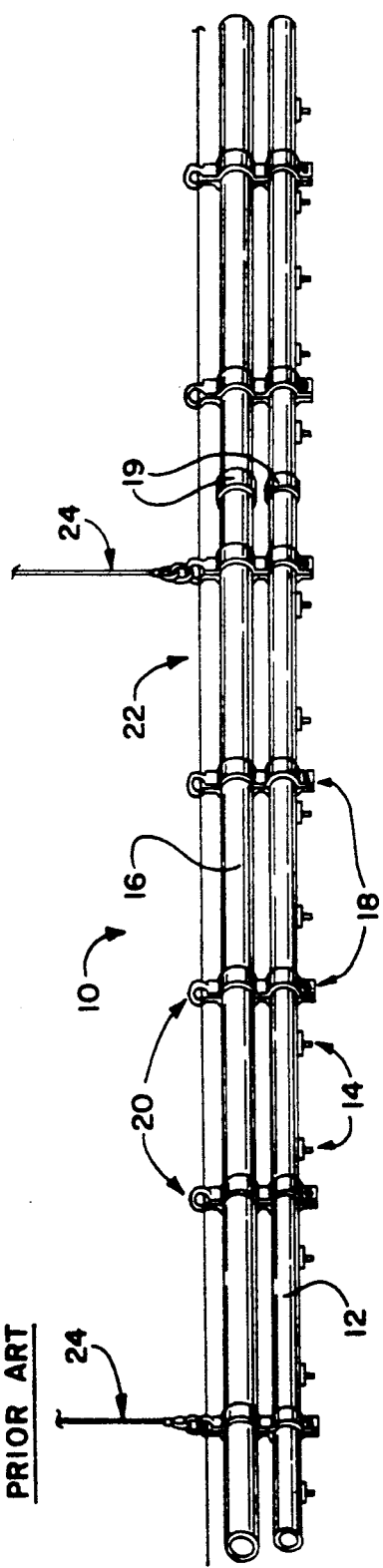
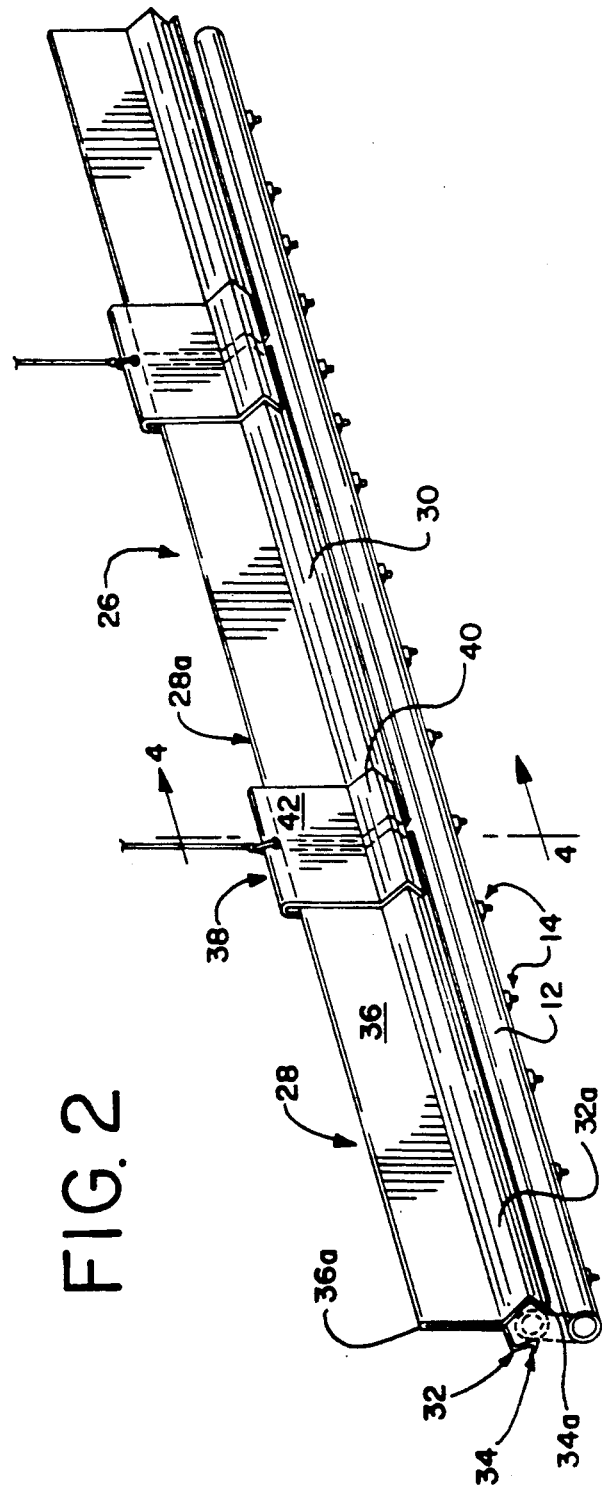

FOWL WATERING SYSTEM

RELATED PATENT APPLICATIONS

This application is a Continuation-In-Part of pending application Ser. No. 07/440,272 filed Nov. 22, 1989.

FIELD AND BACKGROUND OF THE INVENTION

This invention relates generally to pipe hangers, and particularly to an improved watering pipe hanger including means for preventing fowl from roosting on the pipe and hanger.

In the poultry industry, it is necessary to have a drinking water supply readily available to the fowl in the poultry sheds. One prior art device (to be described in more detail hereinafter) incorporates a PVC pipe which carries water and has nipples inserted in the pipe wall, the nipples being engaged by the fowl to release water from the pipe. The PVC pipe is supported along its length by a more rigid metal pipe and connectors at closely spaced intervals. The rigid pipe is attached to an overhead support in a shed by wire hangers at intervals of perhaps ten feet.

Because the fowl tend to roost on top of the rigid pipe, it is desirable to provide a means to discourage the roosting. It is common to have an electrically charged wire supported slightly above the length of the rigid pipe, which causes fowl to avoid the rigid pipe altogether. That system allows the fowl to drink from the nipples in the PVC pipe but discourages them from roosting on the rigid support pipe. The disadvantage of the above prior art system is that it is relatively expensive and difficult to install and maintain because it is made of metal and requires a large number of parts.

Another arrangement is described in the Ehud Uri U.S. Pat. No. 4,852,522 dated Aug. 1, 1989. This arrangement includes a series of flange sections which fit on the upper sides of a plastic water pipe, bridging sections between the flange sections, saddle clamps on the underside of the pipe for fastening the pipe to the flange sections, and hangers attached to the flange sections. The flange section includes an upwardly extending anti-roost part. This arrangement includes five different parts including the pipe, some of the parts being bolted together. As a consequence, this arrangement is relatively expensive to manufacture and difficult to assemble because of the number of parts.

The F. W. Steudler U.S. Pat. No. 4,892,061, dated Jan. 9, 1990, shows a drinking system including an anti-roost wire. This system also includes a water trough having an anti-roost rib on its bottom side (see FIG. 4 of the patent). The system shown in this patent is also constructed of a large number of individual parts which require expense to manufacture and time to assemble.

SUMMARY OF THE INVENTION

The present invention avoids the foregoing problems and comprises apparatus for supporting a water pipe and discouraging roosting but does not require anti-roost wires or a complex pipe support and hanger system. It achieves the desired purpose because it is shaped to both support the water pipe and to discourage roosting by fowl and is formed by a few easily assembled parts.

In one form of the invention, the apparatus comprises one or more pipe hangers, each comprising a clamp having opposing members which form an opening therebetween for a water pipe, and an upwardly extending anti-roost member connected to the upper side of the clamp. Also provided is a coupling having a clamp and an anti-roost member having a substantially identical shape as the pipe hangers. The coupling is also slightly larger than the pipe hangers and envelops the hangers in order to support them.

In another form of the invention, the apparatus comprises integrally formed water pipe and anti-roost parts. The apparatus further comprises coupling parts which are attached to the anti-roost part, the coupling part further being connectable to hanger wires for suspending the apparatus. The coupling and anti-roost parts have interengaging hooks for attaching them together.

BRIEF DESCRIPTION OF THE DRAWINGS

The invention will be better understood from the following detailed description taken in conjunction with the accompanying figures of the drawings, wherein:

FIG. 1 is a perspective view of a prior art fowl watering system;

FIG. 2 is a perspective view of a fowl watering device constructed in accordance with this invention;

DETAILED DESCRIPTION OF THE DRAWINGS

Figure 4:
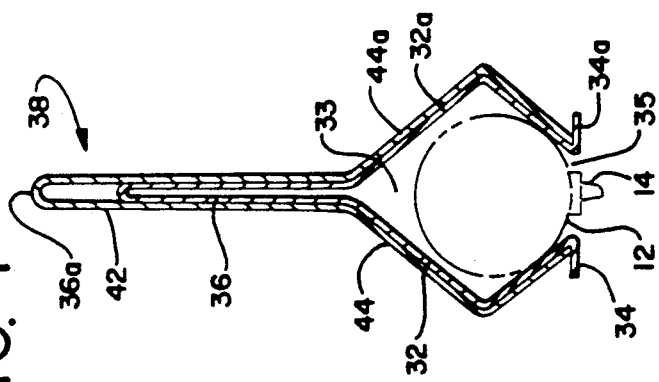
FIG. 4 is an end sectional view of the apparatus of FIG. 2.

Illustrated in FIG. 1 is a prior art system 10 for supplying water to fowl in a poultry barn or shed. The system 10 comprises a water pipe 12 (usually made of PVC) having a series of nipples 14 on its underside which are engaged by the fowl to release water from the water pipe 12. The water pipe 12 is connected to a rigid support pipe 16 by a number of pipe connectors 18. Both water pipe 12 and rigid pipe 16 can be extended by connecting additional pipe utilizing couplers 19. Connected to the pipe connectors 18 are insulated rings 20 which support an electrically charged wire 22 that discourages fowl from roosting on the watering system. Hanger wires 24 suspend the system 10 from a ceiling or other structural frame (not shown) of shed.

FIG. 2 illustrates an embodiment of a fowl watering device 26 in accordance with this invention. A water pipe 12 having nipples 14 is snapped into and supported by a pipe hanger 28 formed by two elements. The first element comprises a supporting clamp 30 which continuously supports the water pipe 12 and yet permits access to the nipples 14. The supporting clamp 30 is formed by two opposing V-shaped members 32 and 32a (see FIG. 4) having upper and lower legs defining an enclosure or opening 33 into which the water pipe 12 is inserted. Attached to the lower legs of the V-shaped members 32 and 32a are two outwardly extending flanges 34 and 34a which prevent gouging of the water pipe 12 during assembly.

The second element of the pipe hanger 28 comprises an anti-roosting portion 36 which, in this embodiment, is formed integrally with the supporting clamp 30 from a single sheet of bendable metal. The anti-roosting portion 36 is an upwardly extending folded portion and each side of the fold is connected to an upper leg of one of the V-shaped members 32 and 32a. In a specific example, the top of the anti-roosting portion 36 is approximately 1¼ inches above the supporting clamp 30 and it forms a narrow upper edge 36a which is too narrow and high for poultry to roost on.

The water pipe 12 is inserted into the pipe hanger 24 by pushing it into the space 35 between the flanges 34 and 34a, which causes the V-shaped members 32 and 32a to flex outwardly until the space 35 is wide enough for the water pipe 12 to fit through, and the pipe 12 snaps into the opening 33 defined by V-shaped members 32 and 32a. Once the water pipe 12 is inserted, the V-shaped members 32 and 32a snap back to their original spacing due to the resiliency of the material from which pipe hanger 26 is made. The opening 33 is wider than the pipe 12 but the space 35 is normally narrower than the diameter of the pipe 12. The nipples 14 extend through the space 35 and are accessible to chickens below the pipe 12.

Figure 3:
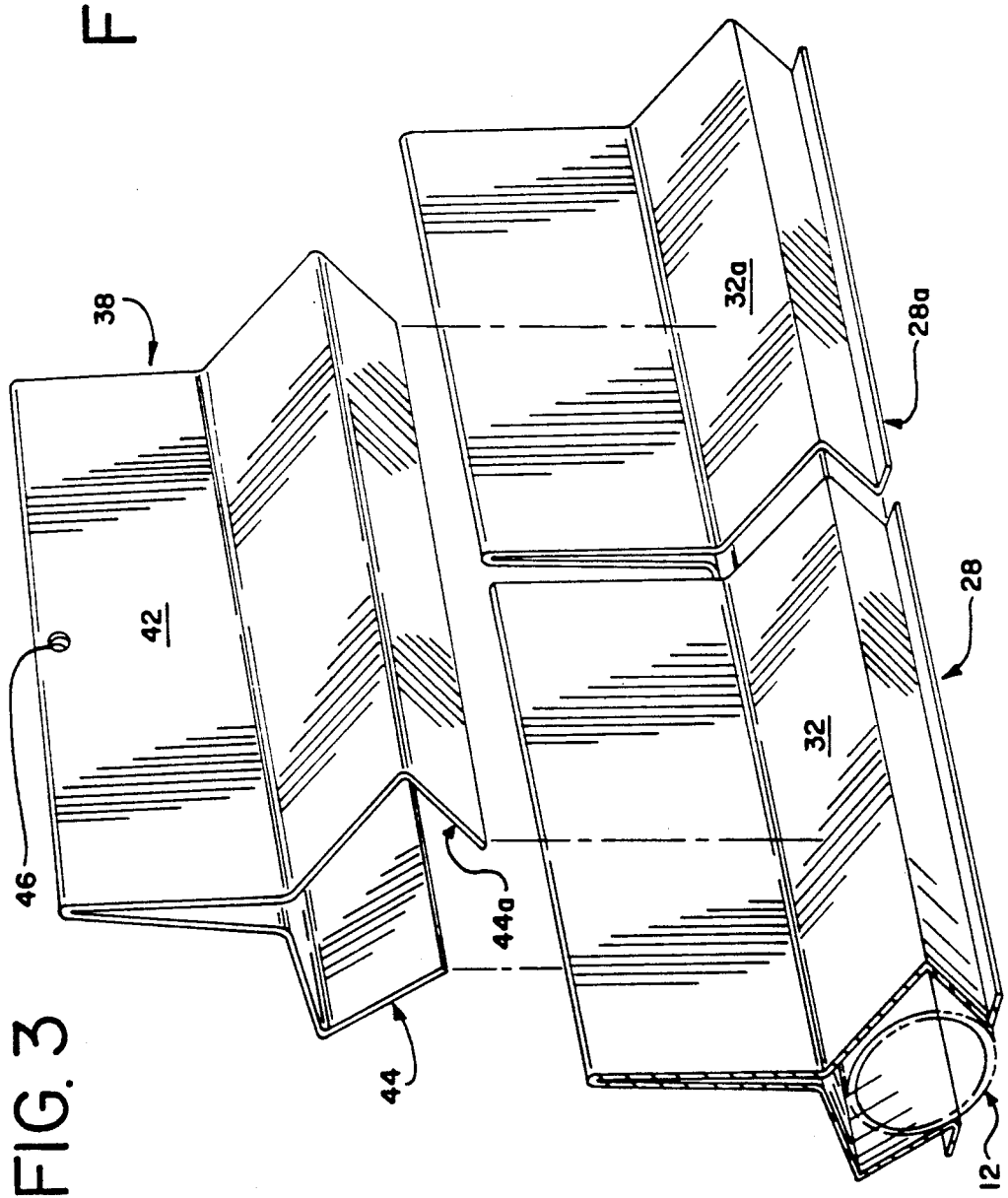
FIG. 3 is an exploded perspective view of the apparatus shown in FIG. 2.
Figure 6:
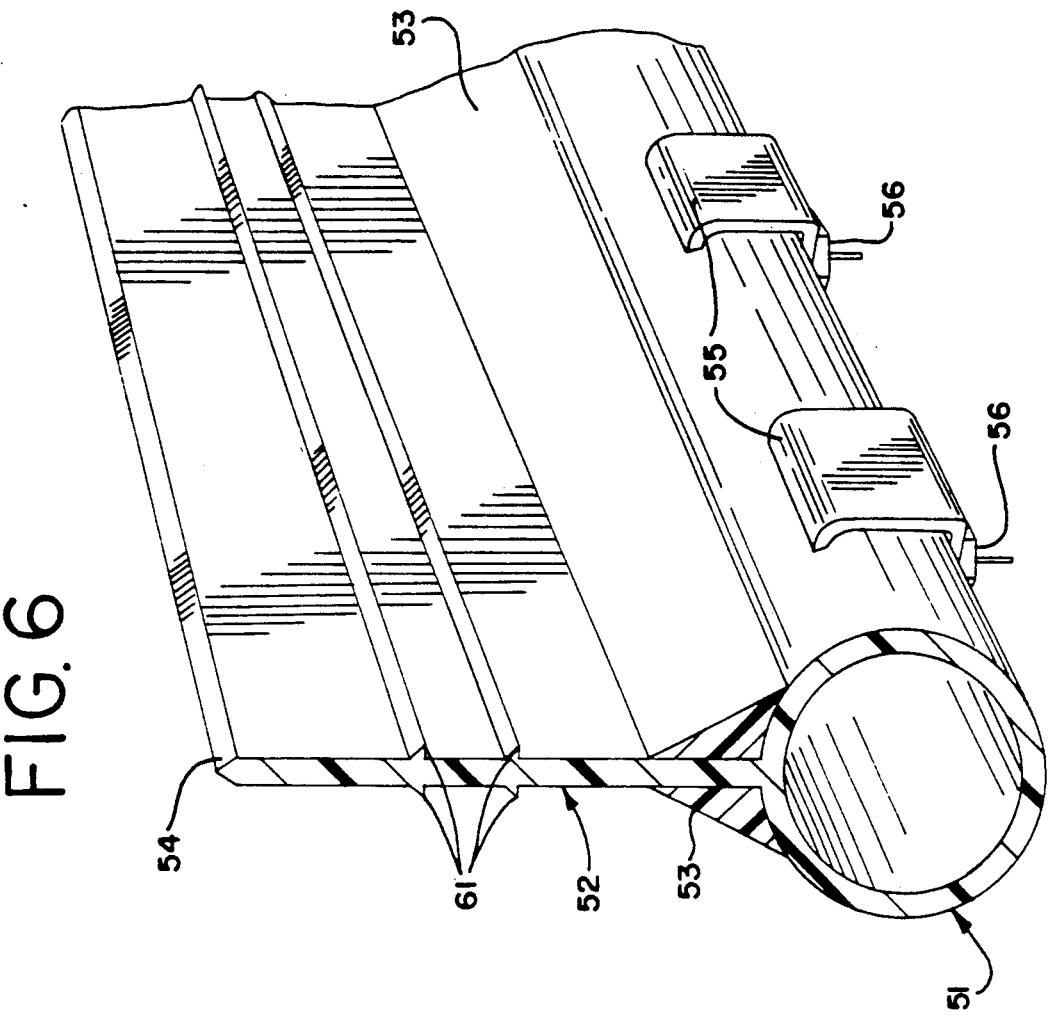
FIG. 6 is another perspective view of the member shown in FIG. 5.

FIGS. 2 and 3 also illustrate a coupling member 38 which includes a clamp 40 and an anti-roost element 42. The coupling member 38 has a shape similar to the pipe hanger 28 except that it is slightly larger than the pipe hanger 28 to enable the pipe hanger 28 to snap into clamp 40, as shown in FIG. 4. The hangers 28 and the members 38 are preferably made of bendable sheet metal.

The relationship between the coupling member 38 and the pipe hanger 28 is best seen in FIGS. 2 to 4. In FIGS. 2 and 3, a series of aligned pipe hangers 28 and 28a support a water pipe 12 and are nearly butted end to end. In FIG. 3, a coupling member 38 is illustrated above the pipe hangers 28 and 28a and in a position to be pushed down onto the pipe hangers, thereby forcing V-shaped members 44 and 44a apart until they are wide enough to accept members 32 and 32a. Once the pipe hangers 28 and 28a are snapped into coupling member 38, the V-shaped members 44 and 44a return to their original relative positions as shown in FIG. 4. The coupling members bridge the joints between adjacent hangers, as shown in FIGS. 2 and 3.

Also seen in FIG. 4 is the relative spacing of the anti-roosting elements 36 and 42. When coupled together, the anti-roosting element 42 extends upwardly higher than element 36. This differential spacing is provided so that a hole 46 formed in it can be threaded with a wire or cable 24 to suspend the whole fowl watering device 26.

Figure 5:
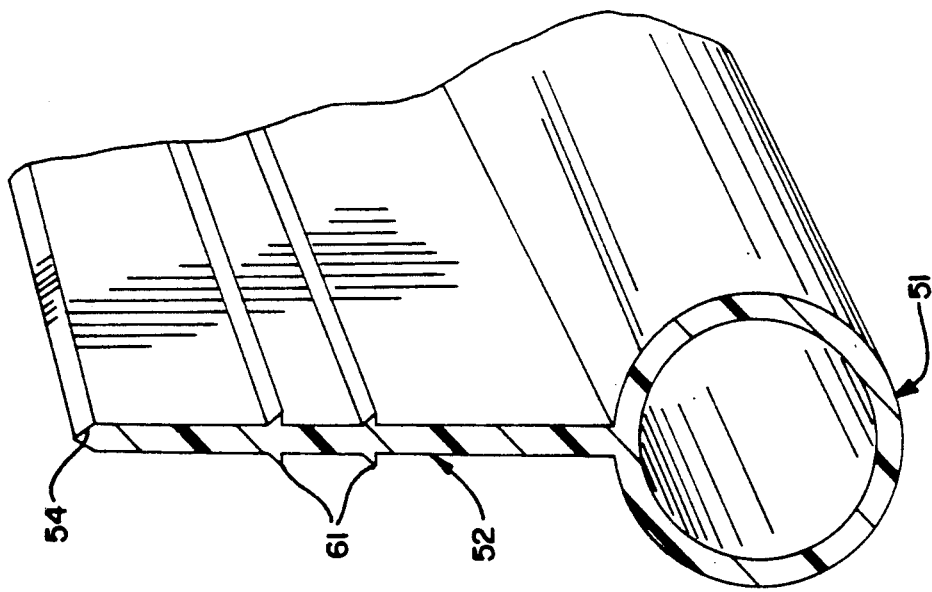
FIG. 5 is a perspective view showing an integral pipe and anti-roost member in accordance with a preferred form of the invention.
Figure 7:
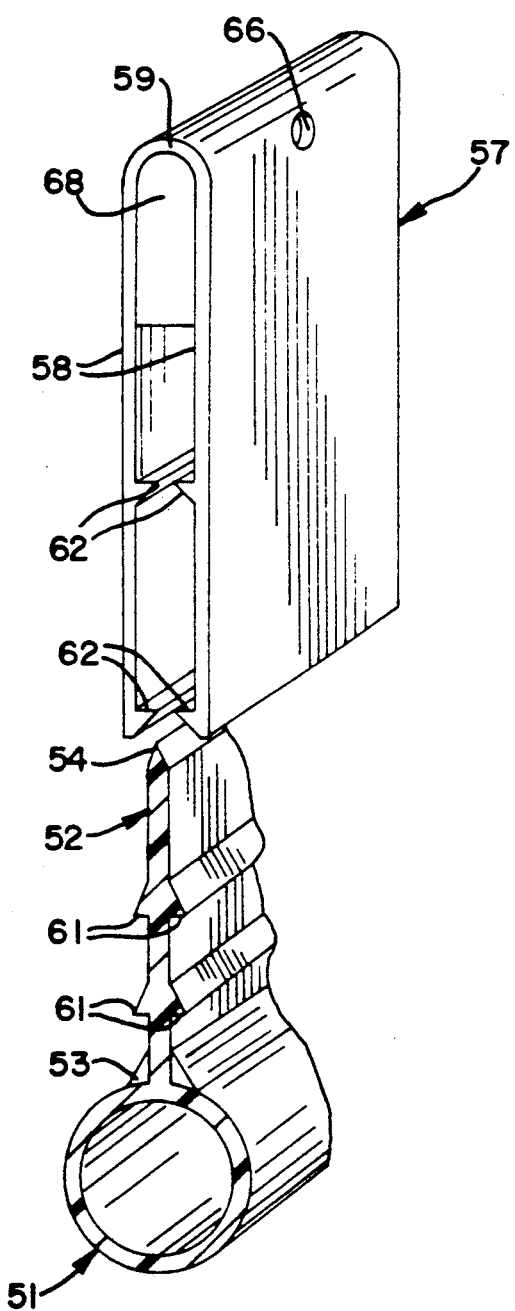
FIG. 7 is an exploded perspective view of an assembly of the member shown in FIG. 5 with a coupling part.
Figure 8:
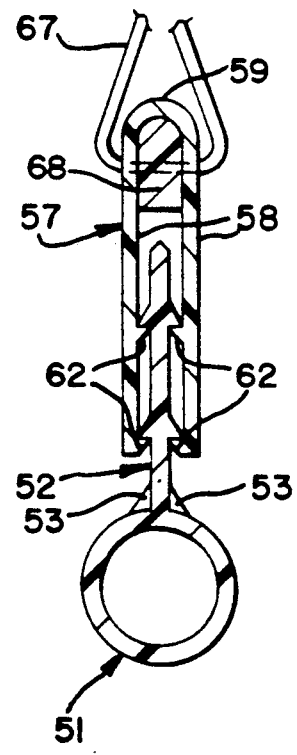
FIG. 8 is a sectional view showing the parts of FIG. 7 fully assembled.

The embodiment of the invention shown in FIGS. 5 to 8 is formed by extruded plastic parts and therefore is preferred where a lower cost assembly is desired. With reference to these figures, the apparatus comprises a tubular water pipe 51 having an upwardly extending slender anti-roost ridge 52 formed on its upper side. In a specific example of the invention, the wall thickness of the pipe 51 and the thickness of the ridge 52 is ⅛ inch; the pipe 51 has an I.D. of ¾ inch and the ridge is about two inches high. Fillets 53 may be formed where the ridge 52 meets the pipe in order to strengthen the connection, and the upper edge 54 of the ridge is preferably a narrow edge 54. The ridge 52 extends the length of the pipe 51 and reinforces it, and its thin, high dimension prevents roosting by the poultry. The fillets 53 may not be required, as illustrated in FIG. 5.

At spaced intervals along the length of the pipe 51 are provided a plurality of nipples 56. The nipples 56 extend through the lower wall of the pipe and have a conventional construction which allows water to be released by upward pressure on the nipple. Clips 55 may be provided to hold the nipples 56 in place on the pipe.

The apparatus further comprises a plurality of couplings 57 (FIGS. 7 and 8) which serve to support the pipes from hangers. Each coupling 57 has an inverted U-shape and includes two vertical walls 58 and a center portion 59. Interengaging sets of ribs 61 and 62 are formed on the sides of the ridge 52 and the interior of the walls 58, respectively. The ribs 61 are downwardly slanted on their upper sides and the ribs 62 are slanted on the undersides. The horizontal spacing between the tips of the ribs 62 is substantially equal to the thickness of the ridge 52, whereby the ribs engage and flex the walls 58 outwardly when the coupling 57 is pressed downwardly over the ridge 52. When fully assembled (FIG. 8), the ribs 62 snap over the ribs 61 and the flat engaging sides of the ribs interengage and prevent the ridge 52 from separating from the coupling 57. The coupling 57 is slidable along the length of the ridge 52 so that it may be moved to a desired location.

A horizontal hole 66 is formed through the coupling 57 close to its center portion 59, and a hanger wire or cable 67 is looped through the hole 66 so that the coupling 57 and the pipe 51 may be suspended from an upper support (not shown). A strengthening material 68 may be placed between the walls 58 and adjacent the center portion 59 in order to strengthen the coupling in the area of the hole 66.

The coupling 57 may be made about six inches (for example) in horizontal length and a sufficient number with wires 67 may be provided to support the weight of the pipe 51 and the water contained in it. The pipe 51 may be provided in ten foot sections which may be coupled end-to-end. A coupling 57 would preferably bridge a joint between two pipe sections.

Like the ridge 52, the horizontal thickness of the coupling 57 is too thin to enable poultry to roost on it. Further, the hanger wire 67 at the center of a six inch long coupling would also prevent roosting.

The pipe 51 and the ridge 52 are preferably formed integrally by extruding a plastic material such as high impact P.V.C. The coupling 57 may also be extruded of P.V.C. and cut into short sections.

It will be apparent from the foregoing that a novel and advantageous system has been provided. In one form of the invention, it is formed by sheet metal parts which are readily bent to the shapes shown and described, and the parts are easily assembled by snapping the water pipe into the pipe hangers, connecting the hangers using the coupling members, and then suspending the coupling members. In the second form of the invention, the parts are inexpensively formed of an extruded plastic, and the parts are few and may be easily assembled by snapping them together. In addition to supporting the water pipe, the system also includes means for inhibiting the fowl from roosting on the system. The fowl cannot perch on the narrow, vertically elongated parts, thereby eliminating the need for an electrical wire.

I claim:

1. Apparatus comprising a tubular water pipe, a thin vertically elongated ridge formed on the upper side of and extending the length of said pipe, said pipe and said ridge being integrally formed of plastic, said ridge having opposing vertical sides, at least one coupling extending adjacent said sides of said ridge, interengaging means on said ridge and on said coupling for attaching said coupling to said ridge, said interengaging means comprising a laterally extending rib on each of said opposing vertical sides and ribs on said coupling which engage said ribs on said ridge, and at least one strengthening means on said ridge between said pipe and said coupling, and said coupling including means for connection to a hanger wire.

2. Apparatus comprising a plurality of tubular water pipes, a thin vertically elongated ridge formed on the upper side of and extending along the length of each of said pipes, each of said pipes and said ridge associated therewith being integrally formed of plastic, said plurality of tubular water pipes extending in end to end relation and including joint means forming water flow connections between said ends, said ridge having opposing vertical sides, at least one rib formed on each of said vertical sides, at least one coupling extending adjacent said sides of said ridge and interengaging said ribs on said ridge, said coupling extending across said joint means, and said coupling including means for connection to a hanger wire for supporting said coupling and said pipes.

3. Apparatus as set forth in claim 2, and further including additional ribs on said vertical sides of said ridge.

4. Apparatus as set forth in claim 2, and further including a plurality of downwardly facing water nipples connected at spaced intervals to said pipes.

* * * * *